United States Patent [19]

Konchan

[11] Patent Number: 4,602,887
[45] Date of Patent: Jul. 29, 1986

[54] FASTENING ARRANGEMENT FOR VEHICLE BODY DOOR LATCH SYSTEM

[75] Inventor: Jeffrey L. Konchan, Warren, Mich.

[73] Assignee: General Motors Corporation, Detroit, Mich.

[21] Appl. No.: 742,749

[22] Filed: Jun. 10, 1985

[51] Int. Cl.[4] .......................... F16C 11/00; F16D 1/00
[52] U.S. Cl. .......................................... 403/24; 403/71
[58] Field of Search ...................... 403/71, 70, 69, 105, 403/24; 24/30.5 P

[56] References Cited

U.S. PATENT DOCUMENTS 3,086,265  4/1963  Orenick et al. ................... 24/30.5 P
3,467,427  9/1969  Moberg ......................... 24/30.5 P X
3,662,617  5/1972  Bennett et al. ................. 403/105 X
4,482,265  11/1984 Koza ..................................... 403/71

Primary Examiner—Andrew V. Kundrat
Attorney, Agent, or Firm—Herbert Furman

[57] ABSTRACT

A fastening arrangement for interconnecting a pair of levers of a vehicle body door latch system includes a rod having one end non-adjustably connected to one of the levers and the other end adjustably connected to the other lever by a series of truncated cones on the outer surface of the rod engaged by deflectable portions of a fastener secured to the other lever, with the deflectable portions defining an internal truncated cone.

3 Claims, 5 Drawing Figures

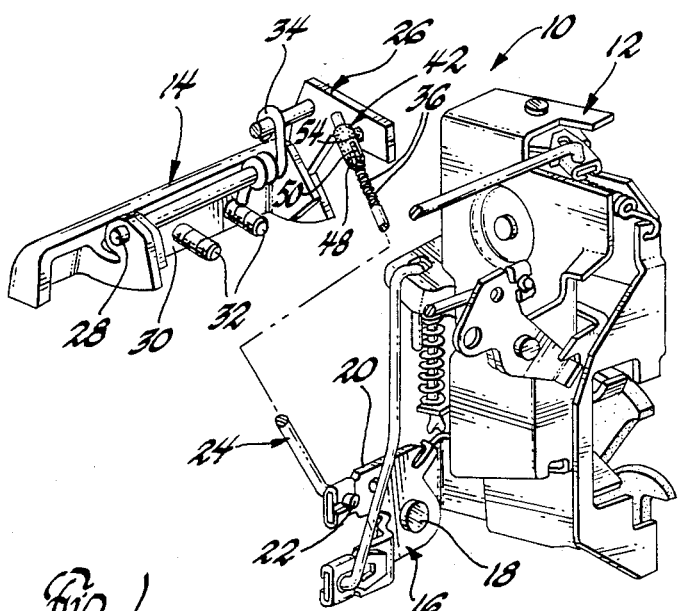

FASTENING ARRANGEMENT FOR VEHICLE BODY DOOR LATCH SYSTEM

This invention relates generally to a fastening arrangement for vehicle body door latch systems and more particularly to a fastening arrangement for connecting levers of such systems.

A vehicle body door latch system includes a door latch as well as other components such as inside and outside releases or handles, and inside and outside operators such as garnish buttons and key cylinders for placing the door latch in either locked or unlocked condition. Many of these components of the system include operating levers which are connected by rods or links for simultaneous operation. Because of production variations, the levers are spaced at varying distances from each other.

It is known to provide various fastening arrangements between such levers in order to obtain simultaneous operation thereof. Such arrangements have included a rod or link having one end non-adjustably secured to one lever and having its other end threaded through a nut or clip secured to the other lever, such as shown in U.S. Pat. No. 4,482,265, Koza et al, Fastener for Interconnecting Vehicle Door Lock Components, issued Nov. 13, 1984.

The fastening arrangement of this invention automatically sets the operating length of a rod connecting spaced levers of a door latch system to ensure simultaneous operation of the levers. In the preferred embodiment, a rod is non-adjustably secured at one end portion thereof to one of the levers and the other end portion of the rod is provided with a series of truncated cones on the exterior surface thereof. The cones are apex to base connected and the bases of the cones face toward the other end of the rod. A fastener includes a tubular body portion which receives the rod therethrough and has at least a pair of deflectable terminal portions at one end thereof, the inner surfaces of which define a truncated interrupted cone matching the shape of the cones of the rod. The fastener is connected to the other lever.

The rod is installed with the one end thereof non-adjustably secured to one lever and the fastener located remote from the other end of the rod, either on the non-conical part thereof or on a remote truncated cone. The fastener is secured to the other lever after locating the other lever in its fully operated position. When the other lever is released for movement to its non-operating position, the deflectable terminal portions of the fastener ratchet over the truncated cones of the rod until the lever reaches its non-operating position. This automatically sets the distance between the levers to provide for subsequent simultaneous operation thereof. The engagement of the apical ends of the terminal portions with the base of the truncated cone preceding the finally engaged cone blocks return movement of the fastener toward the one end portion of the rod.

The primary feature of this invention is that it provides an improved fastening arrangement for connecting a pair of operating levers of components of a vehicle body door latch system. Another feature is that the arrangement automatically sets the operating length of a rod connecting the levers. A further feature is that the rod has one end portion non-adjustably coupled to one of the levers, its other end portion automatically adjustable with respect to the other of the levers to fix the operating length of the rod between the levers. Yet another feature is that the other end portion of the rod has the outer surface thereof provided with a series of truncated cones which are selectively engageable by deflectable portions of a fastener secured to the other lever to fix the length of the rod between the levers. Yet a further feature is that the deflectable portions of the fastener define an internal truncated cone matching the shape of the cones of the rod, with the deflectable portions ratcheting or moving over the cones on the rod in a one way direction relative thereto. Still another feature is that the truncated cones on the outer surface of the rod are apex to base connected with the bases thereof facing toward the other end of the rod and with the deflectable portions of the fastener being movable toward the other end of the rod and into successive engagement with the cones to fix the length between the levers.

These and other features will be readily apparent from the following specification and drawings wherein:

FIG. 1 is a perspective view of a vehicle body door latch system including a fastening arrangement according to this invention.

FIG. 2 is an enlarged partial broken away view of a portion of FIG. 1.

FIG. 3 is a sectional view of the fastener.

FIG. 4 is a partial broken away view taken along line 4—4 of FIG. 3, and

FIG. 5 is a view taken along line 5—5 of FIG. 3.

Referring now particularly to FIG. 1 of the drawings, a vehicle body door latch system designated generally 10 includes a door latch 12, an outside door handle 14, an inside remote handle, not shown, and inside and outside operators, not shown, for placing the door latch in locked or unlocked conditions. The system shown in FIG. 1 is disclosed in detail in copending application Ser. No. 673,673 filed Nov. 21, 1984, Frederic R. Adams et al, Vehicle Closure Latch, and assigned to the assignee of this invention. The door latch 12 includes an operating lever 16 which is pivoted at 18 to the latch frame. A leg 20 of lever 16 is non-adjustably connected to the lower bent end portion 22 of a rod 24 which forms part of the fastening arrangement of this invention. The end portion 22 of the rod 24 is slipped through an aperture in the leg 20 and secured thereto by a conventional spring clip to non-adjustably secure the rod to the lever 16. The upper end portion of the rod 24 is adjustably connected to an integral arm or lever 26 of the handle 14 as will be described. The handle 14 is pivoted at 28 to a support 30 bolted at 32 to the outer panel of the door (not shown). Upon lifting of the handle or clockwise movement thereof as viewed in FIG. 1, against the bias of spring 34, the lever 26 of the handle moves in the same direction or downwardly to in turn simultaneously pivot the lever 16 counterclockwise about pivot 18 and release the latch bolt, if the latch is in the unlocked condition, as described in detail in the aforementioned application.

As best shown in FIG. 2, the upper end portion of the rod 24 is provided with a series of truncated cones 36 which are connected in apex 38 to base 40 fashion, with the bases 40 of the cones all facing in the direction of the upper end of the rod 24. A fastener 42 of plastic material includes a hollow tubular body portion 44 which receives the upper end portion of the rod 24 therethrough. The body portion 44 includes a pair of outwardly deflectable integral terminal portions 46 at the frusto-conically shaped lower end 48 thereof. The terminal portions 46 are defined by oppositely disposed slots 50 in the body portion 44. The internal surfaces of the terminal portions 46 define an interrupted internal truncated cone 52 which matches the shape of the cones 36 on the outer surface of the rod 24.

The fastener 42 further includes an integral cylindrical extension or arm 54 having a counterbored end 56 provided with a pair of oppositely disposed slots 58 and a flared interrupted head 60. The interrupted head 60 is forced through an aperture 62 of the lever 26, as the slots 58 collapse, to secure the fastener 42 to the lever as shown in FIGS. 1 and 2.

The fastener 42 is located on the non-conical portion of the rod 24 below the most remote cones 64 or on the most remote cone prior to installation of the rod. In installing the rod 24, the lower end portion 22 thereof is non-adjustably attached to the leg 20 of the lever 16 and the handle 14 is then manually lifted or rotated clockwise to rotate the arm 26 clockwise about pin 28 to its operated position against the bias of spring 34. The head 60 is then inserted through the opening 62 of lever 26 to thereby connect the rod between the levers 16 and 26. Upon release of the handle 14 and movement thereof to the non-operated position shown in FIG. 1 under the bias of spring 34, the fastener 42 moves upwardly of the rod 24 toward the upper end thereof as the deflectable terminal portions 46 ratchet past the truncated cones 36 above cone 64. As soon as the handle 14 reaches its non-operated position, the engagement of the deflectable portions 46 with the truncated cone 66, FIG. 2, automatically fixes the operating length of rod 24 between the lever 26 of the handle and the lever arm 20 of lever 16 to provide for simultaneous operation of both levers when the handle 14 is thereafter lifted or rotated clockwise to operated position. The engagement of the apical ends of the deflectable terminal portions 46 with the base of the truncated cone preceding the engaged cone 66 provides for a one way connection between the deflectable portions 46 and the rod 24. If the distance between the lever arm 20 and lever 26 decreases for any reason the insertion of a suitable tool in the slots 50 to deflect the portions 46 outwardly relative to each other permits these portions to be moved toward the lower end of the rod for engagement with a truncated cone 36 preceding cone 66. If for any reason the distance increases between levers 16 and 26, the adjustment is automatic as is apparent from the previous description.

Thus this invention provides an improved fastening arrangement for automatically interconnecting a pair of levers of a vehicle body door latch system.

The embodiments of the invention in which an exclusive property or privilege is claimed are defined as follows:

1. A fastening arrangement for adjustably interconnecting a pair of levers of a vehicle body door latch system comprising, in combination, a rod extending between the levers, means non-adjustably connecting one end of the rod to one of the levers, a series of truncated cones on the external surface of the rod adjacent the other end thereof with their bases facing the other end of the rod, a fastener including a body portion having at least a pair of deflectable terminal portions cooperatively defining an interrupted internal truncated cone matching the shape of the external truncated cones of the rod, the terminal portions being initially engageable with a cone of the rod remote from the other end thereof and being successively engageable with each succeeding cone of the rod upon movement of the fastener in one direction along the rod toward the other end thereof to locate the fastener relative to the other of the levers, movement of the fastener in the other direction along the rod being blocked by engagement of the deflectable terminal portions with the base of the preceding truncated cone of the rod, and means securing the fastener to the other of the levers.

2. A fastening arrangement for adjustably interconnecting a pair of levers of a vehicle body door latch system comprising, in combination, a rod extending between the levers, means non-adjustably connecting one end of the rod to one of the levers, a series of interconnected truncated cones on the external surface of the rod adjacent the other end thereof, the cones being apex to base connected with the bases of the cones facing the other end of the rod, a fastener including a body portion having at least a pair of outwardly deflectable terminal portions cooperatively defining an interrupted internal truncated cone matching the shape of the external truncated cones of the rod, the terminal portions being initially engageable with a cone of the rod remote from the other end thereof and being successively engageable with each succeeding cone of the rod upon movement of the fastener toward the other end of the rod to thereby adjustably secure the fastener to the rod at predetermined distances relative to the one end thereof, and relative to the other of the levers, movement of the fastener toward the one end of the rod being blocked by engagement of the deflectable terminal portions with the base of the preceding truncated cone of the rod, and means securing the fastener to the other of the levers.

3. A fastening arrangement for adjustably interconnecting a pair of levers of a vehicle body door latch system comprising, in combination, a rod extending between the levers, means non-adjustably connecting one end of the rod to one of the levers, a series of truncated cones on the external surface of the rod adjacent the other end thereof, the cones being apex to base connected with the bases of the cones facing the other end of the rod, a fastener of plastic material including a tubular body portion receiving the rod therethrough and having a pair of outwardly deflectable integral terminal portions cooperatively defining an interrupted internal truncated cone matching the shape of the external truncated cones of the rod, the terminal portions being initially engageable with a cone of the rod remote from the other end thereof and being successively engageable with each succeeding cone of the rod upon movement of the fastener along the rod toward the other end thereof to adjustably secure the fastener to the rod at predetermined distances relative to the one end thereof and relative to the other of the levers, movement of the fastener toward the one end of the rod being blocked by engagement of the apical ends of the deflectable terminal portions with the base of the preceding truncated cone of the rod, and means securing the fastener to the other of the levers.

* * * * *